United States Patent [19]

Liberti

[11] 4,263,409

[45] Apr. 21, 1981

[54] PROCESS FOR THE PRODUCTION OF A FOAMED THERMOPLASTIC COMPOSITION

[75] Inventor: Frank N. Liberti, Mt. Vernon, Ind.

[73] Assignee: General Electric Company, Pittsfield, Mass.

[21] Appl. No.: 11,540

[22] Filed: Feb. 12, 1979

Related U.S. Application Data

[63] Continuation of Ser. No. 494,039, Aug. 2, 1974, abandoned, which is a continuation-in-part of Ser. No. 380,144, Jul. 18, 1973, abandoned.

[51] Int. Cl.$^3$ .................................................. C08J 9/06
[52] U.S. Cl. ........................................ 521/81; 264/54; 521/79; 521/139; 521/180
[58] Field of Search ...................... 521/79, 81; 264/54

[56] References Cited

U.S. PATENT DOCUMENTS

| | | | |
|---|---|---|---|
| 2,465,319 | 3/1949 | Whinfield et al. | 528/276 |
| 2,953,551 | 9/1960 | White | 526/329 |
| 2,964,794 | 12/1960 | Peilstöcker et al. | 528/204 |
| 2,999,835 | 9/1961 | Goldberg | 525/464 |
| 3,028,365 | 4/1962 | Schnell et al. | 528/196 |
| 3,047,539 | 7/1962 | Pegnilly | 528/285 |
| 3,189,662 | 6/1965 | Vaughn | 525/464 |
| 3,268,636 | 8/1966 | Angell | 264/51 |
| 3,277,029 | 10/1966 | Chadwick | 521/79 |
| 3,290,261 | 12/1966 | Goldblum | 521/79 |
| 3,304,282 | 2/1967 | Cadus et al. | 260/37 |
| 3,306,874 | 2/1967 | Hay | 528/212 |
| 3,306,875 | 2/1967 | Hay | 528/212 |
| 3,334,154 | 8/1967 | Kim | 525/470 |
| 3,377,296 | 4/1968 | Dwyer et al. | 521/155 |
| 3,383,435 | 5/1968 | Cizek | 525/132 |
| 3,396,142 | 8/1968 | Little et al. | 260/42.18 |
| 3,408,225 | 10/1968 | Streib et al. | 260/37 |
| 3,431,224 | 3/1969 | Goldblum | 525/146 |
| 3,436,446 | 4/1969 | Angell | 264/51 |
| 3,437,632 | 4/1969 | Hechelhammer et al. | 260/37 |
| 3,502,754 | 3/1970 | Fehn | 521/79 |
| 3,504,068 | 3/1970 | Zizlsperger et al. | 264/41 |
| 3,671,487 | 6/1972 | Abolins | 260/40 R |
| 3,678,079 | 7/1972 | Carty et al. | 260/37 PC |

FOREIGN PATENT DOCUMENTS 838824  6/1960  United Kingdom .

*Primary Examiner*—Wilbert J. Briggs, Sr.
*Attorney, Agent, or Firm*—Morgan, Finnegan, Pine, Foley & Lee

[57] ABSTRACT

A process for the production of a foamed thermoplastic composition which comprises blending a minor amount of a foaming agent with a thermoplastic resin in an extruder and comminuting the resultant extrudate.

14 Claims, No Drawings

PROCESS FOR THE PRODUCTION OF A FOAMED THERMOPLASTIC COMPOSITION

This is a continuation of application Ser. No. 494,039 filed Aug. 2, 1974 abandoned which in turn is a continuation-in-part of Ser. No. 380,144, filed July 18, 1973, now abandoned.

This invention relates to a process for the production of a foamed thermoplastic composition which comprises blending a minor amount of a foaming agent with a thermoplastic resin in an extruder and comminuting the resultant extrudate.

BACKGROUND OF THE INVENTION

It is known to add a foaming agent to thermoplastics from U.S. Pat. Nos. 2,964,794; 3,268,636; 3,277,029; 3,290,261; 3,377,296; 3,436,446 and British patent 838,824. From U.S. patents 3,304,282; 3,396,142; 3,408,225; 3,437,632; 3,671,487 and 3,678,079, it is known to prepare glass fiber reinforced thermoplastics. Also, U.S. Pat. No. 3,334,154 discloses a polymer composition employing a flame-retardant additive comprising a copolymer. However, none of these references discloses a process for producing a foamed thermoplastic composition which comprises blending a minor amount of a foaming agent with the thermoplastic resin in an extruder and comminuting the resultant extrudate.

It has been discovered that a foamed thermoplastic composition is prepared by blending a minor amount of a foaming agent with a thermoplastic resin in an extruder and comminuting the resulting extrudate into foamed pellets or other suitable shapes. Thus, a foamed pellet, for example, is produced which does not require the use of additional foaming agent prior to molding and can be fed into a standard injection molding machine to produce a foamed part directly.

DESCRIPTION OF THE INVENTION

This invention is directed to a process for the production of a foamed thermoplastic composition which comprises blending a minor amount of a foaming agent with a thermoplastic resin in an extruder and comminuting the resultant extrudate.

Preferably, the thermoplastic resin is selected from the group consisting of a polycarbonate, a polyester, a polyphenylene ether or a mixture thereof with a polystyrene resin.

The thermoplastic resin may contain additives such as a flame retardant additive, an impact enhancing additive, a filler such as fibrous glass or a mineral or mixtures thereof, etc. These additives are generally well known in the art. The type and amount of additive is not material to the instant invention and all types and amount of additives normally employed with a particular resin system are within the scope of this invention.

The thermoplastic resins are selected from aromatic polycarbonates, such as phosgene-bisphenol-A reaction products; polyesters, such as wholly aromatic polyesters, e.g., hydroquinoneterephthaloyl chloride reaction products, wholly aliphatic polyesters, and poly(alkylene iso and terephthalates), such as the highly polymerized reaction products of an ester of the corresponding phthalic acid with a glycol, such as described in U.S. Pat. Nos. 2,465,319 and 3,047,539, and elsewhere; polyphenylene ethers, such as poly(2,6-dimethyl-1,4-phenylene) ether and poly(2,6-diphenyl-1,4-phenylene) either alone and in combination with styrene resins.

The aromatic polycarbonates are polymers of dihydric phenols and carbonate precursors. The dihydric phenols that can be employed are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, etc., dihydric phenol ethers such as bis(4-hydroxyphenyl) ether, bis(3,5-dichloro-4-hydroxyphenyl) ether, etc.; dihydroxydiphenyls such as p,p'-dihydroxydiphenyl, 3,3'-dichloro-4,4'-dihydroxydiphenyl, etc.; dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2,5-dichlorobenzene, 1,4-hydroxy-3-methylbenzene, etc., and dihydroxy diphenyl sulfoxides such as bis(4-hydroxyphenyl) sulfoxide, bis-(3,5-dibromo-4-hydroxyphenyl) sulfoxide, etc. A variety of additional dihydric phenols are also available to provide carbonate polymers and are disclosed in U.S. Pat. Nos. 2,999,835; 3,028,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl) propane, 2,2-bis(3,5-dibromo-4-hydroxyphenyl) propane, etc. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride also known as phosgene is preferred. The polycarbonates are prepared by methods well known to those skilled in the art.

The polyesters include linear saturated condensation products of diols and dicarboxylic acids, or reactive derivatives thereof. Preferably, they will comprise condensation products of aromatic dicarboxylic acids or esters and aliphatic diols. It is to be understood that it is also possible to use polyesters such as poly(1,4-dimethylolcyclohexane dicarboxylates, e.g., terephthalates). In addition to phthalates, small amounts, e.g., from 0.5 to 15% by weight, of other aromatic dicarboxylic acids, such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols. In any event, the preferred polyesters are well known as film and fiber formers, and they are provided by methods outlined in Whinfield, U.S. Pat. No. 2,465,319 and Pengilly, U.S. Pat. No. 3,047,539 and elsewhere. The preferred polyesters will comprise a poly(alkylene terephthalate, isophthalate or mixed isophthalate-terephthalate, e.g., up to 30 mole % isophthalate), said alkylene groups containing from 2 to 10 carbon atoms, e.g., poly(ethylene terephthalate) or poly (1,4-butylene terephthalate).

Also included are poly(butylene terephthalate) copolyester resins.

Among the units which can be present in the poly(butylene terephthalate) copolyester resins are: aliphatic dicarboxylic acids, e.g., of up to about 50 carbon atoms, including cycloaliphatic, straight and branched chain, acids, such as adipic acid, cyclohexanediacetic acid, dimerized $C_{16}$–$C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acid and the like. In addition to the 1,4-butylene glycol units, there can also be minor amounts of units derived from other aliphatic glycols and polyols, e.g., of up to about 50 carbon atoms, including ethylene glycol, propylene glycol, glycerol, cyclohexanediol, and the like. Such copolyesters can be made by techniques well known to those skilled in the art.

The polyphenylene ether resin may be in combination with styrene resin.

A polyphenylene ester resin and a styrene resin that may be employed are available commercially or can be prepared by known techniques. For example, from about 10 to about 60 parts of a polyphenylene ether resin, prepared, e.g., by the procedure in U.S. Pat. Nos. 3,306,874 and 3,306,875, can be combined with from about 90 to 40 parts styrene resin, as described in U.S. Pat. No. 3,383,435 by, e.g., passing mixtures of the resin through a single-screw extruder at a temperature between 450° and 550° F. and cooling and chopping the extrudate into pellets.

The polyphenylene ether may be one of a family represented by the formula

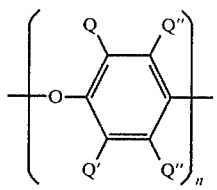

wherein Q is a hydrocarbon radical, a halohydrocarbon radical having at least two carbon atoms between the halogen atom and the phenol nucleus, a hydrocarbonoxy radical or a halohydrocarbonoxy radical having at least two carbon atoms between the halogen and the phenol nucleus; Q' is as defined for Q and in addition, halogen. Q" are each as defined for Q' and in addition, hydrogen, provided that Q,Q' and Q" are all free of a tertiary alpha-carbon atom; and n is at least about 50. Herein, "hydrocarbon" and derivatives thereof, such as "halohydrocarbon," preferably contain up to about 12 carbon atoms and especially preferably up to about 8 carbon atoms.

Styrene resins included are those having at least 25% by weight of repeating units derived from a vinyl aromatic compound of the formula

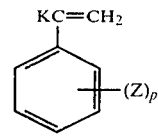

wherein R is hydrogen, (lower)alkyl or halogen; Z is vinyl, halogen or (lower) alkyl; and p is 0 or an integer of from 1 to the number of replaceable hydrogen atoms on the benzene nucleus. Herein, the term "(lower)alkyl" means alkyl from 1 to 6 carbon atoms.

The term "styrene resins" is used broadly to define components fully described in the above-mentioned Cizek U.S. Pat. No. 3,383,435. Merely by way of illustration, such resins will be homopolymers, such as polystyrene, polychlorostyrene and polyvinyl toluene, the modified polystyrenes such as rubber modified polystyrene blended or grafted high impact products, e.g., the rubber being a polybutadiene or a rubbery copolymer of from about 2 to about 30% styrene and from about 98 to about 70% of a diene monomer. Also included are styrene containing copolymers, such as styrene-acrylonitrile copolymers, styrene-butadiene copolymers, styrene-acrylonitrile-butadiene terpolymers, poly-alpha-methylstyrene, copolymers of ethyl vinyl benzene and divinyl benzene, and the like.

The flame-retardant additives which may be added to the thermoplastic resin comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with an organic or inorganic antimony compound, e.g., antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive that may be used will be from about 0.5 to about 50 parts by weight per hundred parts of resin. A preferred range will be from about 3 to 25 parts and an especially preferred range will be from about 5 to 15 parts of additive per 100 parts of resin. Smaller amounts of compounds highly concentrated in the elements responsible for flame-retardance will be sufficient, e.g., elemental red phosphorus will be preferred at 0.5 to 10 parts by weight per hundred parts of resin while phosphorus in the triphenyl phosphate will be used at 5 to 25 parts of phosphate per part of resin and so forth. Halogenated aromatics will be used at 2 to 20 parts and synergists, e.g., inorganic or organic antimony compounds, such as antimony oxide, will be used at about 1 to 10 parts by weight per 100 parts of resin.

Among the useful halogen-containing compounds are those of the formula

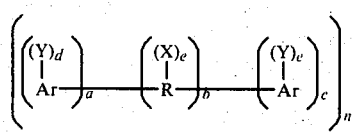

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; a sulfur-containing linkage, e.g., sulfide, sulfoxide, sulfone, thiocarbonate; a phosphorus-containing linkage, and the like. R can also consist of two or more alkylene or alkylidene linkages connected by such groups as aromatic, ether, ester, carbonyl, sulfide, sulfoxide, sulfone, a phosphorus-containing linkage, and the like. R can be derived from a dihydric phenol, e.g., bisphenol-A, and the like. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) hydroxy or ether groups of the general formula OE, wherein E is hydrogen or a monovalent hydrocarbon radical similar to X or (3) monovalent hydrocarbon groups of the type represented by R or (4) other substituents, e.g., cyano, etc. said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c. represent whole numbers including 0. When b is not 0, neither a nor c may be 0. Otherwise either a or c, but not both, may be 0. Where b is 0, the aromatic groups are joined by a direct carbon-to-carbon bond.

The Y substituents on the aromatic groups, Ar and Ar' can be varied in the ortho, meta or para positions on the aromatic rings and the groups can be in any possible geometric relationship with respect to one another.

Included within the scope of the bisphenols included in the above formula are the following:
2,2-bis(4-hydroxy, 3,5-dichlorophenyl)propane
bis(4-hydroxy, 3-chlorophenyl)methane
bis(4-hydroxy, 3,5-dibromophenyl)methane
1,2-bis(4-hydroxy, 3,5-dichlorophenyl)ethane
1,1-bis(4-hydroxy, 3,5-dichlorophenyl)ethane
3,3-bis(4-hydroxy, 3,5-dichlorophenyl)pentane
bis(4-hydroxy, 3,5-dichlorophenyl)cyclohexylmethane The preparation of these and other applicable bisphenols are known in the art. In place of the divalent aliphatic group in the above examples may be substituted sulfide, sulfoxy and the like.

Included within the above structural formula are substituted benzenes exemplified by tetrabormobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

In general, preferred phosphorus compounds are selected from elemental phosphorus or organic phosphonic acids, phosphonates, phosphinates, phosphonites, phosphinites, phosphine oxides, phosphines, phosphites or phosphates. Illustrative is triphenyl phosphine oxide. These can be used alone or mixed with hexabromobenzene or a chlorinated biphenyl and, optionally, antimony oxide.

Typical of the phosphorus compounds which may be employed herein would be those having the general formula

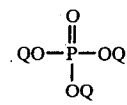

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenylbis (3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolyphosphate, tritolyl phosphate, bis(2-ethylhexyl)-phenyl phosphate, tri(nonylphenyl)phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide or tetrakis(hydroxymethyl) phosphonium chloride. These flame-retardant additives are commercially available.

A preferred flame-retardant additive which may be included within this invention is a copolycarbonate which is derived from a halogen-substituted dihydric phenol and a dihydric phenol, said halogen preferably being chlorine or bromine. Preferably, this copolycarbonate is the product of a halogenated bisphenol-A such as tetrabromobisphenol-A and tetrachlorobisphenol-A and a dihydric phenol such as bisphenol-A. Preferably, this copolycarbonate consists of 75 to 25 weight percent of the product of tetrabromobisphenol-A and, correspondingly, 25 to 75 weight percent of the product of bisphenol-A based on the weight of the copolycarbonates. The preparation of this copolycarbonate is set forth in U.S. Pat. No. 3,334,154 which is incorporated herein by reference.

Another preferred flame-retardant additve which may be included within this invention are low molecular weight polymers of a carbonate of a halogenated dihydric phenol. Such polymers may contain from 2 to 10 repeating units of the formula

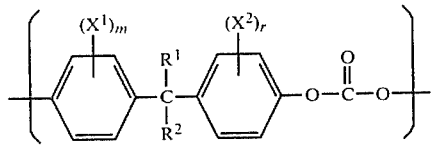

wherein $R^1$ and $R^2$ are hydrogen, (loweralkyl or phenyl, $X^1$ and $X^2$ are bromo or chloro and m and r are from 1 to 4. The polymeric additives will have a low volatility when heated above 200° C., and a softening point of less than about 300° C. They will be used alone or in combination with synergists, such as inorganic or organic antimony-containing compounds.

These polymeric additives can be made by polymerizing a mixture of a halogenated dihydric phenol and a chain stopper, e.g., an alcohol, carboxylic acid, carboxylic acid halide or, preferably a monohydric phenol, and most preferably a halogenated phenol and phosgene or a reactive derivative thereof in the presence of an acid acceptor, e.g., an amine or caustic. Details concerning the preparation and use of such compounds are given in the copending patent application of Daniel W. Fox, "Flame Retardant Compounds and Thermoplastic Compositions Containing the Same" Ser. No. 194,518, filed on Nov. 1, 1971 and incorporated herein by reference.

Another preferred additive can be made by polymerizing a mixture of tetrabromobisphenol-A and 2,4,6-tribromophenol with phosgene in either methylene chloride in the presence of pyridine or in methylene chloride containing triethylamine in admixture with an aqueous caustic phase. The product of such a process will be a polymer of the formula

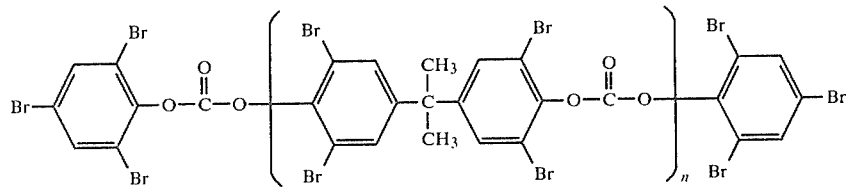

wherein the average number of repeating units, n, will be from about 3 to about 7, and the softening point will be in the range of from 200° to 260° C.

The preferred polymeric additives can be used within the concentration ranges specified above for halogenated compounds in general, but preferably will be used in amounts of from about 5 to about 25 parts by weight per 100 parts by weight of the flammable polyester resinous components in the composition.

Inorganic and organic antimony compounds are widely available or can be made in known ways. In preferred embodiments, the type of antimony compound used is not critical, being a choice primarily based on economics. For example, as inorganic antimony compounds there can be used antimony oxide, ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids, and the like. Illustrative of the organic antimony compounds, including inorganic salts of such compounds are KSb tartrate, Sb caproate; $Sb(OCH_2CH_3)_3$; $Sb(OCH(CH_3)CH_2CH_3)_3$; Sb polymethylene glycolate; triphenyl antimony; and the like. Especially preferred is antimony oxide.

The filler consisting of fibrous glass or a mineral or mixtures thereof employed in the present composition is well known to those skilled in the art. By fibrous glass materials, it is understood that glass silk, as well as all glass fiber materials derived therefrom including glass fiber fabrics, rovings, staple fibers and glass fiber mats are included. The length of the glass filaments and whether or not they are bundled into fibers and the fibers bundled in turn to yarns, ropes or rovings, or woven into mats, and the like, are also not critical to the invention. However, when using fibrous glass filaments, they may first be formed and gathered into a bundle known as a strand. In order to bind the filaments into a strand so that the strand can be handled, a binder or binding agent is applied to the glass filaments. Subsequently, the strand can be chopped into various lengths as desired. It is convenient to use the strands in lengths of from about ⅛" to about 1" long, preferably less than ¼" in length. These are called chopped strands. Some of these binding agents are polymers such as polyvinyl acetate, particular polyester resins, polycarbonates, starch, acrylic melamine, polyvinyl chloride, polymethylene oxide or polyvinyl alcohol. Also, the filler may be a mineral such as synthetic or naturally occurring silicates. Aluminum silicate, talc, asbestos, Wollastonite, etc. are preferred minerals. A preferred form of the mineral is a finely divided powder. The filler may also comprise mixtures of glass and a mineral. Any suitable method of incorporating the filler with the polyester resin can be used such as blending chopped glass strands with the polyester resin so that glass fibers are uniformly dispersed therein. Preferably, the polyester resin contains from about 1 to about 50 weight percent of the filler.

The foaming agents of the present invention are selected from chemicals containing decomposable groups such as azo, N-nitroso, carboxylate, cabonate, heterocyclic nitrogen containing and sulfonyl hydrazide groups.

Representative compounds include azodicarbonamide, dinitrosopentamethylene tetramine, p,p'-oxy-bis-(benzenesulfonyl)-hydrazide, benzene-1,3-disulfonyl hydrazide, azo-bis-(isobutyronitrile), biuret, urea and the like. Also, 5-phenyltetrazole is a preferred chemical foaming agent. The temperature and pressures to which the foamable composition of the invention are subjected to provide a foamed polyester will vary within a wide range, depending upon the amount and type of foaming agent that is used. Preferably, from about 0.02 to about 2.0 weight percent of the foaming agent based on weight of the resin is used. However, higher amounts of foaming agent are within the scope of this invention. The preferred foaming agents are dinitrosopentamethylene tetramine, p-toluene sulfonyl semicarbazide, 5-phenyltetrazole, calcium oxalate and trihydrazino-s-triazine.

The impact enhancing additives are themselves well known commercially available materials. U.S. Pat. No. 3,431,224, which is incorporated herein by reference, discloses most of these materials. These materials are, in general, any polyethylene, whether linear or cross-linked, may be employed to provide the resinous mixtures of the invention. The densities and melt indices of the polyethylene used in such capacities have been found not to be critical. For example, polyethylene having densities as low as 0.91 and as high as 0.98, with melt indices ranging from 0.18 to 50 have been employed in various combinations with polycarbonate resins with beneficial results as far as the improvement of environmental crazing and cracking resistance is concerned. However, from the standpoint of general appearance of molded parts prepared from polycarbonate-polyethylene mixtures, the preferred range of density of polyethylene is from 0.95 to 0.97 with the melt index ranging from 0.18 to 9.0. Similarly, any linear or cross-linked polypropylene may be employed. As in the case of polyethylene, the melt index and density of the polypropylene useful in the practice of the invention is not critical. However, a polypropylene having a density of the order of 0.91 and a melt index raning from 0.7 to 12.0 is generally preferred.

Also, both the linear and cross-linked polymers of ethylene with propylene may also be advantageously employed to provide polycarbonate mixtures with impact enhancing properties. As in the cases of polyethylene and polypropylene, the melt indices and densities of ethylene-propylene copolymers are not critical from the standpoint of their used in accordance with the invention.

Further, the isobutylene polymers useful to provide the resin mixtures with impact enhancing properties have, in general, molecular weights greater than 75,000 and preferably of the order of 100,000-200,000 and above, with a density of the order of 0.8-1.0.

The ethylene-alkyl acrylate copolymers useful in providing resinous mixtures with impact enhancing properties are the well known copolymers of ethylene with alkyl ester of acrylic acid. Generally speaking, such polymers contain recurring structural units of the formula

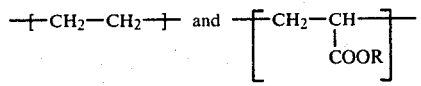

where R is an alkyl radical containing from 1 to about 15 carbon atoms such as, for example, methyl, ethyl, propyl, butyl, hexyl, heptyl and 2 ethyl hexyl. Examples of copolymers of ethylene with alkyl acrylates which are particularly suitable in the practice of the invention are disclosed in U.S. Pat. No. 2,953,551. Generally, such copolymers have densities of the order of 0.915–0.94 and a ratio of the

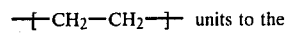 units to the

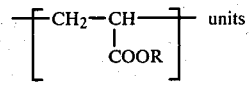 units of from about 65:1 to about 500:1.

The polyurethane elastomers useful in providing impact enhancing properties to the resinous mixtures are the condensation products of a diisocyanate, a hydroxy terminated polyether or polyester, and a glycol or a diamine. Such materials are characterized by a specific gravity of from about 1.19 to about 1.26 and a tensile strength of from about 2,500 to about 20,000 psi. Examples of suitable materials are the condensation products of diisocyanates such as 2,4 tolylene diisocyanate, with a polyester such as, for example, polyethylene succinate or polyethylene adipate, and a glycol such as ethylene glycol or 1,4 butane diol. Also, the organopolysiloxane-polycarbonate polymers are known from U.S. Pat. No. 3,189,662 which is incorporated herein by reference.

The preferred amount of the impact enhancing additive is present in an amount ranging from about 2.0 to about 25 weight percent based on the total weigh of the resin.

It is also regarded to be among the features of this invention to include in the compositions, other ingredients, such as fillers, mold release agents, pigments, stabilizers, nucleating agents, and the like, in conventional amounts for their conventionally employed purposes.

The manner of adding the flame retardant additives, the filler, the impact enhancing additive, etc. to the thermoplastic resin is not critical; is conventional; and will be obvious to those skilled in the art. Preferably, however, each ingredient is added as part of a blend premix and to this is added the foaming agent. This composition is passed through an extruder at a temperature dependent on the needs of the particular compositions. The resulting extrudate is comminuted into foamable pellets or other suitable shapes or molding granules.

DESCRIPTION OF THE PREFERRED EMBDIMENT

The following Examples are set forth herein to illustrate in more detail the preferred embodiments and to illustrate more clearly the principle and practice of this invention to those skilled in the art. Unless otherwise specified, where parts or percents are mentioned, they are parts or percents by weight.

EXAMPLE I

To a mixture of 95 parts of polycarbonate powder and 5 parts of chopped glass fiber is added 0.5 parts 5-phenyltetrazole in a blender. The mixture is extruded at approximately 520° F. and the extrudate is comminuted into pellets. The density of the pellets is about 0.80.

The pellets are subsequently injection molded at approximately 600° F. to produce molded parts with density about 0.90 as compared to a solid density of 1.23.

EXAMPLE II

Example I is repeated except that 2.0 parts of 5-phenyltetrazole are added. The density of the pellets is about 0.50 and the density of the molded parts is about 0.70.

EXAMPLE III 0.5 parts of calcium oxalate is added to polycarbonate powder and the mixture processed as in claim I. The pellets have density 0.85 and the molded parts have density 0.95 as compared to a solid density of 1.23.

EXAMPLE IV

To a blend of 60 parts of high impact polystyrene and 40 parts of polyphenylene oxide is added 1.0 part trihydrazino-s-triazine foaming agent. The mixture is extruded at approximately 520° F. and comminuted into pellets. The density of the pellets is about 0.75 and the density of the molded parts is about 0.90 as compared to a solid density of 1.10.

EXAMPLE V

To a mixture of 70 parts of poly(butylene terephthalate) and 30% chopped glass fibers is added 1.0 part of 5-phenyltetrazole. The mixture is extruded at 450° F. and comminuted into pellets. The density of the pellets is about 1.20 and the density of the molded parts is about 1.30 as compared to a solid density of 1.52.

As seen in the Examples, the process of the instant invention produces a foamed granule directly. This granule can then be fed into a standard injection molding machine to produce a foamed part directly.

Obviously, other modifications and variations of the present invention are possible in the light of the above teachings. It is therefore to be understood that changes may be made in the particular embodiments of the invention described which are within the full intended scope of the invention as defined by the appended claims.

What is claimed is:

1. A process for the production of an injection moldable foamed thermoplastic composition which consists essentially of blending from about 0.10 to about 5.0 weight percent based on the weight of resin of a chemical foaming agent containing a decomposable group selected from azo, N-nitroso, carboxylate, carbonate, heterocyclic nitrogen containing and sulfonyl hydrazide groups with a thermoplastic resin selected from the group consisting of an aromatic polycarbonate; a saturated polyester, a polyphenylene ether and a mixture thereof with a polystyrene resin, extruding at an elevated constant temperature below the decomposition temperature of said resin and comminuting the resultant extrudate into pellets or molding granules.

2. The process of claim 1 wherein the polycarbonate is an aromatic carbonate polymer of a dihydric phenol and a carbonate precursor.

3. The process of claim 2 wherein the aromatic carbonate polymer is a reaction product of bisphenol-A and phosgene.

4. The process of claim 1 wherein the polyester is the reaction product of a dicarboxylic acid and a diol.

5. The process of claim 4 wherein the polyester is a poly(butylene terephthalate).

6. The process of claim 1 wherein the thermoplastic resin is a blend of a polyphenylene ether resin and a styrene resin.

7. The process of claim 1 wherein the thermoplastic resin contains a filler selected from the group consisting of fibrous glass or a mineral or a mixture thereof.

8. The process of claim 1 wherein the thermoplastic resin contains a flame retardant additive.

9. The process of claim 8 wherein said flame retardant additive is a halogen-containing compound, a halogen-containing compound in admixture with an antimony compound; elemental phosphorus or a phosphorus compound; a halogen-containing compound in admixture with a phosphorus compound; a compound containing phosphorus-nitrogen bonds; or a mixture of the foregoing, and said compound is present in an amount of from about 0.5 to about 50 weight percent based on the weight of resin.

10. The process of claim 1 wherein the thermoplastic resin contains an impact enhancing additive.

11. The process of claim 10 wherein said impact enhancing additive is selected from the group consisting of polyethylene, polypropylene, polyisobutylene, a copolymer of ethylene and an alkyl acrylate, a copolymer of ethylene and propylene, a polyurethane elastomer, and an organopolysiloxane polycarbonate polymer.

12. A process for the production of an injection moldable foamed thermoplastic composition which consists essentially of blending from about 0.10 to about 5.0 weight percent based on the weight of resin of a chemical foaming agent selected from the group consisting of dinitrosopentamethylene tetramine, p-toluene sulfonyl semicarbazide, 5-phenyltetrazole, calcium oxalate, trihydrazine-s-triazine, azodicarbonamide, and mixtures thereof, with a thermoplastic resin selected from the group consisting of an aromatic polycarbonate, a saturated polyester consisting of an aromatic polycarbonate, a saturated polyester, a polyphenylene ether and a mixture thereof with a polystyrene resin, extruding at an elevated constant temperature below the decomposition temperatures of said resin and comminuting the resultant extrudate into pellets or molding granules.

13. A process for the production of a molded thermoplastic composition which consists essentially of the steps of:
(a) admixing from about 0.10 to about 5.0 weight percent based on the weight of resin of a chemical foaming agent containing a decomposable group selected from azo, N-nitroso, carboxylate, carbonate, heterocyclic nitrogen containing and sulfonyl hydrazide groups with a thermoplastic resin selected from the group consisting of an aromatic polycarbonate, a saturated polyester, a polyphenylene ether and mixture thereof with a polystyrene resin;
(b) extruding the admixture from step (b) at an elevated constant temperature below the decomposition temperature of said resin;
(c) comminuting the resultant extrudate to produce injection moldable particles; and
(d) injection molding the particles from step (c).

14. A process for the production of a molded thermoplastic composition which consists essentially of the steps of:
(a) admixing from about 0.10 to about 5.0 weight percent based on the weight of resin of a chemical foaming agent selected from the group consisting of dinitrosopentamethylene tetramine, p-toluene sulfonyl semicarbazide, 5-phenyltetrazole, calcium oxalate, trihydrazino-s-triazine, azodicarbonamide, and mixtures thereof, with a thermoplastic resin selected from the group consisting of an aromatic polycarbonate, a saturated polyester, a polyphenylene ether and a mixture thereof with a polystyrene resin;

(b) extruding the admixture from step (b) at an elevated constant temperature below the decomposition temperature of said resin;

(c) comminuting the resultant extrudate to produce injection moldable particles; and (d) injection molding the particles from step (c).

* * * * *

UNITED STATES PATENT AND TRADEMARK OFFICE
CERTIFICATE OF CORRECTION

PATENT NO. : 4,263,409
DATED : April 21, 1981
INVENTOR(S) : Frank N. Liberti

It is certified that error appears in the above—identified patent and that said Letters Patent is hereby corrected as shown below:

In Column 12, line 41, "temperatures" should read --temperature--.

In Column 12, line 54, after "and" and before "mixture" --a-- should be inserted.

Signed and Sealed this

Third Day of November 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,263,409

DATED : April 21, 1981

INVENTOR(S) : Frank N. Liberti

It is certified that error appears in the above–identified patent and that said Letters Patent are hereby corrected as shown below:

Column 4, line 8 -- $KC=CH_2$ -- should be -- $RC=CH_2$ --

Signed and Sealed this

Sixteenth Day of February 1982

[SEAL]

Attest:

Attesting Officer

GERALD J. MOSSINGHOFF

*Commissioner of Patents and Trademarks*